(12) United States Patent
Maurer

(10) Patent No.: US 8,398,933 B2
(45) Date of Patent: Mar. 19, 2013

(54) DEVICE FOR PREVENTING CORROSION ON A GAS INLET NOZZLE DURING NITRIC ACID CONDENSATION

(75) Inventor: Rainer Maurer, Schwelm (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 0 days.

(21) Appl. No.: 13/356,738

(22) Filed: Jan. 24, 2012

(65) Prior Publication Data

US 2012/0119395 A1     May 17, 2012

Related U.S. Application Data

(62) Division of application No. 12/499,530, filed as application No. PCT/EP2007/010062 on Nov. 21, 2007, now Pat. No. 8,176,654.

(30) Foreign Application Priority Data

Feb. 13, 2007    (DE) .......................... 10 2007 006 889

(51) Int. Cl.
- *F27D 1/12* (2006.01)
- *F27B 14/10* (2006.01)
- *B08B 3/00* (2006.01)
- *F26B 19/00* (2006.01)
- *F16K 49/00* (2006.01)

(52) U.S. Cl. ........ 422/307; 423/237; 423/262; 423/351; 423/392; 423/403; 134/105; 134/198; 34/548; 34/549; 137/338

(58) Field of Classification Search ............ 422/4, 9–10, 422/285, 307; 423/235, 237, 262, 269, 351, 423/DIG. 6, DIG. 8, 392–394, 403; 134/11, 134/21, 105, 198; 34/402, 428, 435, 548, 34/549; 137/338
See application file for complete search history.

(56) References Cited

U.S. PATENT DOCUMENTS

| 3,467,498 A | 9/1969 | Benner, Jr. et al. |
| 3,586,055 A * | 6/1971 | Wilson ........................... 138/39 |
| 5,266,291 A * | 11/1993 | Drnevich et al. ............. 423/392 |

FOREIGN PATENT DOCUMENTS

| DE | 1 195 280 | 10/1963 |
| WO | WO 91/16266 | 10/1991 |

OTHER PUBLICATIONS

International Search Report of PCT/EP2007/010062, Feb. 1, 2008.

\* cited by examiner

*Primary Examiner* — Jill Warden
*Assistant Examiner* — Monzer Chorbaji
(74) *Attorney, Agent, or Firm* — Collard & Roe, P.C.

(57) ABSTRACT

By a method and a device for preventing corrosion on and in the region of a gas inlet nozzle during nitric acid condensation, contact of the condensing gas with the nozzle and with the surroundings of the nozzle are supposed to be minimized. This is achieved in that the gas inlet nozzle has a sleeve on the inside in the transition region to the interior of the condenser, by which sleeve a gas inlet orifice in the form of an annular gap is formed, whereby the annular space is provided with at least one feed opening for secondary air, so that an enveloping flow of secondary air is produced around the entering NO gas.

3 Claims, 1 Drawing Sheet

DEVICE FOR PREVENTING CORROSION ON A GAS INLET NOZZLE DURING NITRIC ACID CONDENSATION

This application is a divisional of and Applicant claims priority under 35 U.S.C. §§120 and 121 of parent U.S. patent application Ser. No. 12/449,531 filed on Aug. 12, 2009, which application has now issued as U.S. Pat. No. 8,176,654 and which application is a national stage application under 35 U.S.C. §371 of PCT/EP2007/010062 filed on Nov. 21, 2007, which claims priority under 35 U.S.C. §119 of German Application No. 10 2007 006 889.3 filed on Feb. 13, 2007, the disclosures of each of which are hereby incorporated by reference. The international application under PCT article 21(2) was not published in English.

BACKGROUND OF THE INVENTION

1. Field of the Invention

This invention relates to a method and a device for preventing corrosion on and in the region of a gas inlet nozzle during nitric acid condensation.

2. The Prior Art

In nitric acid facilities that operate under high pressure >10 bar, the condensation point of the acid is correspondingly high, at about 120° C. This leads to higher corrosive attacks on the gas nozzles on the inlet side, especially in the first gas-cooling stage. Increased acid condensation occurs especially at the transition zones between the cooled jacket and the hot nozzle wall, followed by revaporization. The acid, then concentrated except for the azeotrope, leads to severe rates of erosion of the stainless steel material to the point of leakage.

SUMMARY OF THE INVENTION

This is the starting point for the invention, the task of which consists in minimizing the contact of the condensing gas with the nozzle and its surroundings.

This problem is solved according to the invention by a method of the type indicated initially, in that the gas inlet nozzle has a sleeve on the inside in the transition region to the interior of the condenser, by which sleeve a gas inlet orifice in the form of an annular gap is formed, whereby the annular space is provided with at least one feed opening for secondary air, so that an enveloping flow of secondary air is produced around the entering NO gas.

Providing a veil of secondary air on the inside wall of the gas inlet nozzle prevents, or minimizes to a substantial degree, the contact of the NO gas with this inside wall, and thereby it is correspondingly protected.

According to the invention, such an enveloping flow can be produced by blowing in the secondary air through a plurality of inlet holes on the gas inlet nozzle.

An important benefit of the method of procedure according to the invention consists in the fact that only a portion of the secondary air supplied to the condenser by way of a bypass is needed for this protective measure, so that no process changes at all are necessary because of the method of procedure of the invention.

Since the entering gas has about a 17% fraction of water, which is brought about primarily by the water of combustion, and the condensation point of the water and of the acid then immediately formed depends on the partial pressure of the water, the condensation starts at higher temperatures, in particular at higher gas pressures. The partial pressure of the water vapor is then correspondingly reduced by the proposed measure, by the veil and thus by the addition of air, and the condensing gas is kept completely away from the wall of the pipe, so that no condensation, and thus no acid formation, can any longer occur on the inside of the nozzle conducting the pressure.

According to the invention, the above problem can also be solved by a device that is characterized in that the gas inlet nozzle has a sleeve on the inside in the transition region to the interior of the condenser, by which a gas inlet orifice in the form of an annular gap is formed, whereby the annular space is equipped with at least one feed orifice for secondary air.

As already explained above, the secondary air displaces the aggressive condensing gas completely from the gap between the inside wall of the nozzle and the additional pipe, with the result that no acid can be formed here. This protects the inner nozzle (liner) formed by the pipe from attack by acid, since the wall temperature can always be kept above the condensation temperature by the hot secondary air.

A feed nozzle for different gas streams to a mixing chamber with a central pipe through which a first stream flows, which pipe is surrounded by at least one jacket pipe forming an annular space with the feed of a second gas stream, is itself known; reference is made here to U.S. Pat. No. 3,467,498 or in comparable construction to U.S. Pat. No. 3,586,055, both of which are concerned with preparing pigmented metal oxide. Preventing contact of an aggressive gas stream with components to be protected against corrosion by means of an enveloping flow is not addressed here.

Embodiments of the invention are discussed below.

In this connection, it can be provided that a plurality of secondary air inlet orifices are provided upstream in the direction of flow of the entering NO gas, on the gas inlet nozzle, whereby it is practical if these secondary air inlet orifices are linked by way of a ring line and connected with the source of secondary air, as is likewise provided in a further embodiment of the invention.

It is advantageous for the secondary air to be connected to the secondary air source of a high-pressure nitric acid facility.

BRIEF DESCRIPTION OF THE DRAWINGS

Other characteristics, details, and advantages of the invention are evident from the following description and with reference to the drawing. The drawing shows.

DETAILED DESCRIPTION OF PREFERRED EMBODIMENTS

The condenser labeled in general as 1 has a condenser jacket 2 with a cooled jacket region 3, through which a gas inlet nozzle for the NO gas labeled as 4 passes. The cooling tubes of the acid condenser are labeled in general as 5 in FIG. 1, and are partially cut away for reasons of the illustration.

Figure 1:
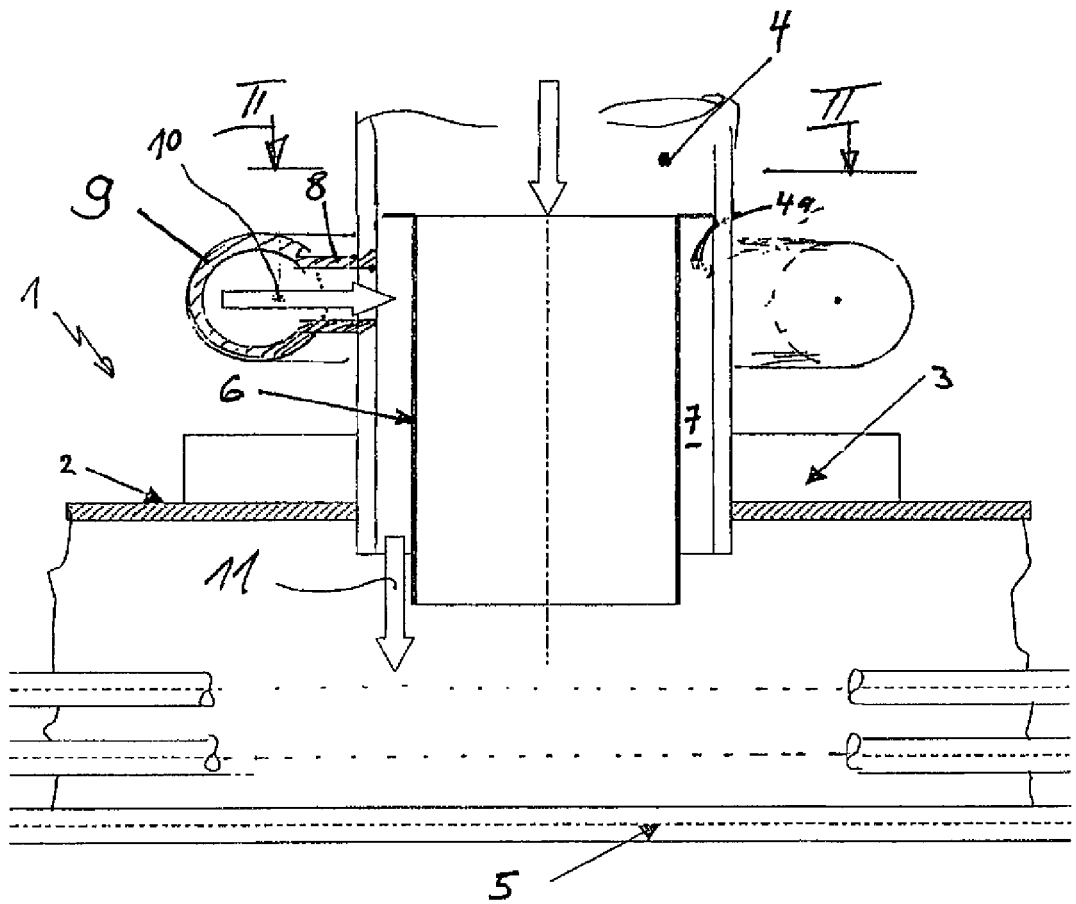
FIG. 1 a sectional drawing from the region of a gas inlet nozzle in a nitric acid condenser, and FIG. 2 a top view, in partial section, of the gas inlet nozzle, along Line II-II in FIG. 1.
Figure 2:
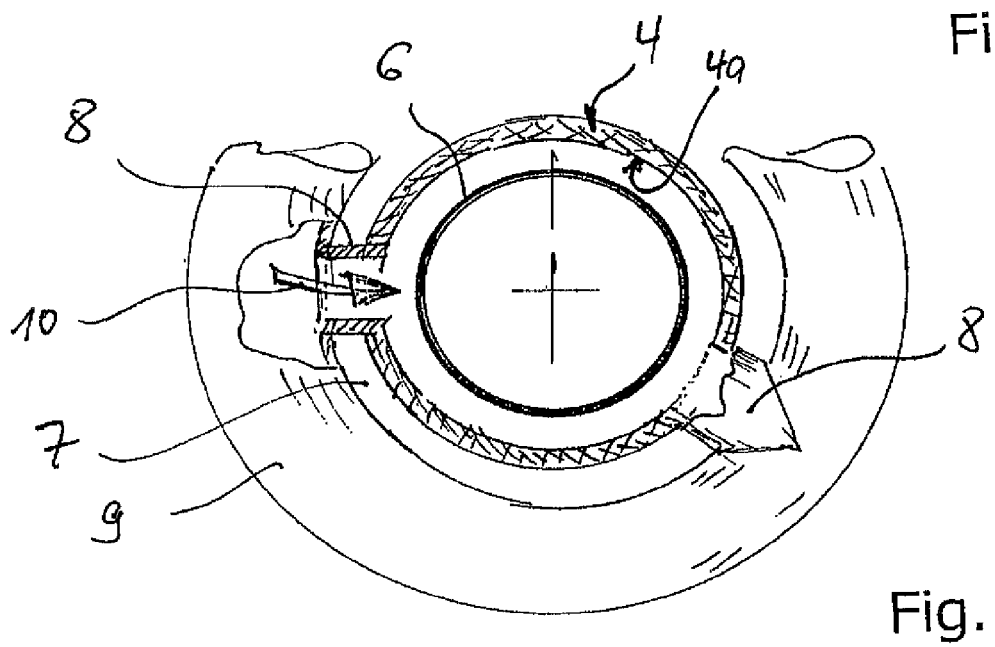

As shown in FIG. 1, the gas inlet nozzle 4 has a safety nozzle 6 in the transition region to the inside of the condenser 1, which nozzle forms an annular space labeled as 7, in the manner of a gap, toward the inside wall 4a of the gas inlet nozzle 4. The annular space 7 is connected with secondary air inlet nozzles 8 distributed around its circumference on a ring line 9, which in turn is connected, for example, to the secondary air source of a high-pressure nitric acid facility, which is not shown in detail in the figures. An enveloping flow 11 is formed by the secondary air inlet, indicated by the arrow 10 in FIG. 1, between the inside wall 4_a_ of the gas inlet nozzle 4 and the safety nozzle or sleeve 6.

Since the secondary air generally has such a high temperature that there is no condensation of the $NO_x$ gas on the safety nozzle or sleeve 6, the safety nozzle 6 is not in danger of corrosion.

Naturally, the exemplary embodiment of the invention as described can also be modified in multiple respects, without departing from the basic concept. Thus, the invention is not limited in particular to proportions and distribution of the secondary air inlet nozzles and their distribution around the circumference. This also applies to the size and diameter of the corresponding components and to the gap width of the gap 7 through which the secondary air flows.

What is claimed is:

1. An apparatus for preventing corrosion on and in a region of a gas inlet nozzle during nitric acid condensation, the apparatus comprising:
   (a) a nitric acid condenser;
   (b) the gas inlet nozzle, the gas inlet nozzle passing into an interior portion of the nitric acid condenser; and
   (c) a sleeve on an inside portion of the gas inlet nozzle in a transition region to the interior portion of the condenser to form a gas inlet orifice comprising an annular gap having an annular space between the sleeve and the gas inlet nozzle, the annular space comprising at least one feed opening for secondary air so that at the entry to the interior portion of the condenser the secondary air from the annular space can form an enveloping flow around NO gas being introduced through an inside of the sleeve;
   wherein a plurality of secondary air inlet orifices are provided on the gas inlet nozzle upstream in a direction of flow of NO gas entering the gas inlet nozzle; and
   wherein the sleeve extends further into the nitric acid condenser than the gas inlet nozzle extends into the nitric acid condenser.

2. The apparatus according to claim 1, wherein the secondary air inlet orifices are linked by way of a ring line and are connected with a source of secondary air.

3. The apparatus according to claim 2, wherein the secondary air inlet orifices are connected with the secondary air source of a high-pressure nitric acid facility.

* * * * *